United States Patent
Borry

(10) Patent No.: US 9,538,707 B2
(45) Date of Patent: Jan. 10, 2017

(54) HARVESTER HEADER WITH BELT LENGTH ADAPTING MECHANISM

(71) Applicant: CNH Industrial America LLC, New Holland, PA (US)

(72) Inventor: Stijn Borry, Pittem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/792,980

(22) Filed: Jul. 7, 2015

(65) Prior Publication Data

US 2016/0007532 A1    Jan. 14, 2016

(30) Foreign Application Priority Data

Jul. 11, 2014  (BE) ................... 2014/0554

(51) Int. Cl.
*A01D 43/00*  (2006.01)
*A01D 41/14*  (2006.01)

(52) U.S. Cl.
CPC .................. *A01D 41/148* (2013.01)

(58) Field of Classification Search
CPC ....... A01D 41/148; A01D 41/14; A01D 57/20
USPC ........................................................ 56/181
See application file for complete search history.

(56) References Cited

U.S. PATENT DOCUMENTS

| | | | |
|---|---|---|---|
| 4,011,709 A | 3/1977 | Mott et al. | |
| 4,177,626 A * | 12/1979 | McNaught | A01D 61/008 198/513 |
| 4,444,000 A * | 4/1984 | Enzmann | A01D 41/16 56/14.6 |
| 4,531,351 A | 7/1985 | Sousek | |
| 4,800,711 A | 1/1989 | Hurlburt et al. | |
| 5,711,140 A | 1/1998 | Burmann | |
| 7,082,742 B2 | 8/2006 | Schrattenecker | |
| 7,168,555 B2 * | 1/2007 | Peterson | B65G 43/00 198/588 |
| 7,380,392 B2 * | 6/2008 | Willem | A01D 41/14 56/314 |
| 7,730,707 B2 | 6/2010 | Pietricola et al. | |
| 7,766,158 B2 * | 8/2010 | Laganiere | A01D 57/20 198/312 |
| 7,971,418 B2 | 7/2011 | Conrad et al. | |
| 7,992,374 B1 * | 8/2011 | Bich | A01D 41/141 56/208 |

(Continued)

FOREIGN PATENT DOCUMENTS

| | | |
|---|---|---|
| CN | 203120462 U | 8/2013 |
| DE | 102012204869 A1 | 10/2013 |

(Continued)

*Primary Examiner* — Árpád Fábián-Kovács
(74) *Attorney, Agent, or Firm* — Peter K. Zacharias; Patrick M. Sheldrake

(57) ABSTRACT

A header for an agricultural harvester has a frame with a floor surface and an auger to laterally transport crop material towards a central aperture, wherein a cutter bar forms the leading edge of the header and is moveable via a slide between a retracted and an extended position, the header further includes a belt conveyor for transporting crop material from the cutter bar to the auger, the belt conveyor is provided with a belt-length-adapting mechanism so that the length of the belt is changeable between a short track and a long track respectively corresponding to the retracted position and the extended position.

14 Claims, 3 Drawing Sheets

(56) References Cited

U.S. PATENT DOCUMENTS

| | | | |
|---|---|---|---|
| 8,241,098 B1* | 8/2012 | Latimer | A01D 41/1217 |
| | | | 198/313 |
| 8,601,780 B2 | 12/2013 | Schmidt et al. | |
| 8,695,315 B2 | 4/2014 | Coon et al. | |
| 2005/0022491 A1* | 2/2005 | Zurn | A01D 57/20 |
| | | | 56/16.4 R |
| 2005/0183932 A1* | 8/2005 | Angleitner | B65G 23/44 |
| | | | 198/618 |
| 2006/0089219 A1* | 4/2006 | Maertens | A01D 41/142 |
| | | | 474/87 |
| 2009/0007534 A1* | 1/2009 | Sauerwein | A01D 41/14 |
| | | | 56/14.5 |
| 2009/0107094 A1* | 4/2009 | Bich | A01D 41/141 |
| | | | 56/10.2 E |
| 2010/0011728 A1* | 1/2010 | Pietricola | A01D 57/04 |
| | | | 56/14.4 |
| 2010/0018176 A1* | 1/2010 | Mortier | A01D 41/148 |
| | | | 56/13.6 |
| 2011/0005184 A1* | 1/2011 | Conrad | A01D 41/148 |
| | | | 56/181 |

FOREIGN PATENT DOCUMENTS

| | | |
|---|---|---|
| EP | 0448844 A1 | 10/1991 |
| WO | 0219793 A1 | 3/2002 |

* cited by examiner

HARVESTER HEADER WITH BELT LENGTH ADAPTING MECHANISM

CROSS REFERENCE TO RELATED APPLICATIONS

This application claims foreign priority under 35 U.S.C. §119 to Belgian Application BE2014/0554 filed Jul. 11, 2014 titled "HEADER" and having Stijn Borry as the inventor. The full disclosure of BE2014/0554 is hereby incorporated herein by reference.

BACKGROUND OF THE INVENTION

1. Field of the Invention

The present invention relates to headers for combines. More particularly, it relates to headers having cutter bars that extend laterally across the width of the leading edge of the header.

2. Description of the Related Art

Headers are devices that are mounted to and across the front of agricultural combines to cut crop plants and direct them toward a crop-receiving opening of the combine for threshing, separating and cleaning inside the combine. Thereby, the header typically has a width that is significantly larger than the width of the crop-receiving opening of the combine. To this end, the header comprises a crop transporting mechanism to transport the crop towards the central crop-receiving opening of the combine.

Headers may use a reciprocating cutter bar or knife that is disposed across the leading edge of the header adjacent to the ground. The cutter bar severs the plant stalks close to the ground. A reel is also typically provided on these headers to control the tops of the plants. The reel pushes the top of the plant rearward, causing the plant to fall onto the header. The header transports the plant laterally toward a central portion of the header where there is a crop-receiving aperture. Once the crop passes through this aperture it is received in a crop-receiving aperture of the combine, which further conveys the plant back rearward into the combine for further processing.

There are two common types of headers, wherein each type of header applies a different technique to transport the crop laterally. The first of these is called an "auger platform" or "auger header". An auger header comprises an auger in the form of a helical screw that extends laterally across the width of the header. The auger is mounted for rotation at a rear end of the header directly above a floor surface of the header frame. In operation, crop plants fall onto the header directly in front of, or somewhat against the auger. Thereby, the crop plants get caught between the auger and the floor surface so that, due to the rotation of the auger, the crop plants are laterally transported towards the crop-receiving aperture.

The second type of header is called a "draper platform" or "draper header". A draper header has no auger located at the rear of the header. The floor surface of the header is instead formed by two generally flat endless loop conveyor belts mounted to move the crop in the lateral direction to the middle of the header. The conveyor belts are typically located immediately behind the cutter bar and take the place of the floor and the auger of the auger header. A central conveyor is located between these two conveyors to receive the cut crop material and convey it rearward into the crop-receiving aperture.

SUMMARY OF THE INVENTION

The present invention relates to an improvement of the auger type header. Most headers are constructed to harvest a wide array of plants, from small shrub-like soybeans plants that are less than 800 mm tall to thick shrub-like European canola plants that can approach 3 m in height. It is difficult to design a static header that is capable of harvesting the full range of plant heights. A static small header is economical to operate, but may not be able to harvest the largest of crop plants.

For this reason, auger-type headers have been configured to have an extendible cutter bar that can move forward and backward in the direction of travel. When the cutter bar is extended (i.e. when it is moved forward in the direction of travel with respect to the rest of the auger header), it is particularly suited to harvest harvesting tall bushy canola plants. When it is retracted it is particularly suited to harvest short, shrub-like plants or grasses.

To prevent crop material from falling into a gap between the extended cutter bar and the leading edge of the auger header frame, a metal sheet is attached to the cutter bar that extends rearward from the back edge of the cutter bar. In the retracted position, the metal sheet overlaps with the floor surface of the header frame. When the cutter bar moves to its extended position, however, the metal sheet covers the gap between the floor surface and the cutter bar.

EP 0 726 025 A1 illustrates an example of this design, showing an auger header with an extendible cutter bar having a flat panel fixed to it that slides backward and forward on top of the flat metal floor of the header when the cutter bar extends and retracts. By automatically overlapping the floor of the header with the panel extending from the cutter bar, the cutter bar can be extended and retracted with little extra work. A drawback of such configuration is that the cutter bar with flat panel slides 'on top' of the floor surface of the header and is consequently positioned 'above' the frame of the header. Because the cutter bar with flat panel is above the frame, distance sensors cannot be mounted to the cutter bar with flat panel (since in the retracted position, the cutter bar with flat panel lays on top of the header frame). Distance sensors should therefore be mounted to the frame of the header, which is at a significant distance from the cutter bar when the cutter bar is extended. Therefore cutting height cannot be controlled in an accurate manner.

Attempts have been made to mount the cutter bar with flat panel below the frame. In such configuration, distance sensors can be mounted close to the cutter bar so that the cutting height can be controlled in an accurate and economic manner. A drawback of such configuration is that the flat metal floor of the header is above the flat panel and consequently the crop plants face a protruding edge when being moved from the flat panel to the flat metal floor. This protruding edge significantly decreases the feeding efficiency of the header.

It is an object of the present invention to provide a header wherein cutting height can be controlled in an accurate and economic manner and wherein feeding efficiency is improved.

To this end, the invention provides in a header for an agricultural harvester comprising a frame adapted to be connected to the agricultural harvester, the frame comprising a floor surface substantially defining the width of the header, wherein an auger is mounted to the frame above the floor surface, the auger being provided to laterally transport crop material towards a central crop-receiving aperture, wherein the header comprises a cutter bar forming the leading edge of the header, the cutter bar being mounted to the frame via a slide so that the cutter bar is moveable between a retracted and an extended position, wherein the header further comprises a belt conveyor for transporting crop material from the cutter bar to the auger, the belt conveyor extending between a first shaft that is mounted to the frame at a predetermined distance from the auger and a second shaft that is mounted to the slide at a predetermined distance from the cutter bar, and wherein the belt conveyor is provided with a belt-length-adapting mechanism so that the length of the belt between the first shaft and the second shaft is changeable between a short track corresponding to the retracted position and a long track corresponding to the extended position of the cutter bar.

The header of the invention is based on a conventional auger type header with an extendable cutter bar. Thereby, an extra element is added to the conventional header being the belt conveyor. The belt conveyor is positioned between the cutter bar and the auger, and is adapted for transporting crop material from the cutter bar to the auger. In this context, it is noted that the conventional draper headers have belt conveyors that laterally transport crop material, thus in a direction perpendicular to the direction of the belt conveyor of the header of the invention. The belt conveyor operates between a first shaft and a second shaft. Thereby the first shaft is mounted to the frame at a predetermined distance from the auger (which auger is also mounted to the frame). It will be clear to a skilled person that the predetermined distance is preferably small so that the first shaft is located in a close neighborhood of the auger. Furthermore, the second shaft is mounted to the slide at a predetermined distance from the cutter bar (which cutter bar is also mounted to the slide). It will be clear to a skilled person that the predetermined distance is preferably small so that the second shaft is located in a close neighborhood of the cutter bar. In this context, the belt length is defined as the length of the functional section of the belt conveyor, being the equal to the distance between the first and the second shaft. Furthermore, belt-length-adapting mechanism is defined as mechanism to amend the belt length being the length of the functional section of the belt (which may not be the same as the belt in its totality).

The length adapting mechanism of the belt conveyor of the invention is configured so that the belt conveyor can extend between (and thereby bridge) the auger and the cutter bar when the cutter bar is retracted, as well as when the cutter bar is extended. This significantly improves the transporting of the crop material from the cutter bar where it is cut to the central crop receiving aperture, thereby improving efficiency. Furthermore, cutting height can be controlled in an accurate and economic manner since sensors can be mounted to the cutter bar. Namely, since crop material is transported from the cutter bar to the auger via the belt conveyor, crop material cannot fall into a gap between the extended cutter bar and the leading edge of the floor surface. As a further result, a metal sheet must not be attached to the cutter bar (which typically overlaps with the floor surface in the retracted position), and consequently the floor surface of the header should not form the lowest part of the header, which can in the present configuration be formed by the slide. Because the slide can form the lowest part of the header is both retracted and extended position, sensors can be mounted to the slide close to the cutter bar. This allows controlling the cutting height in an accurate and economic manner.

Preferably, the belt conveyor comprises at least a third shaft and a fourth shaft respectively connected to the slide and the frame, wherein the third and fourth shaft, together with the first and second shaft, form the belt-length-adapting mechanism. In the configuration with four shafts, two of the shafts (being the second and the third) are connected to the slide while two other shafts (the first and the fourth) are connected to the frame. This allows a skilled person to design a belt conveyor configuration wherein the sliding of the slide results in an extending of a first segment of the belt conveyor between a frame shaft and a slide shaft, and a shortening of a second segment of the belt conveyor so that the sum of the extending and the shortening is substantially zero. Such configuration can be achieved for example by positioning the first and fourth shaft in an area between the second and third shaft (in both retracted and extended position). This has as a result that the belt length that is used to transport crop material from the cutter bar to the auger (and which only forms a segment of the total belt) can be changed in length, while the total length of the belt remains the same.

Preferably, the first shaft is positioned at least partially above the floor surface. The first shaft is the shaft that is mounted to the frame at a predetermined distance from the auger. Thereby, the first shaft is typically located close to the auger to deliver the crop material at the auger. By mounting the first shaft above the floor surface, crop material that is transported towards the auger faces a downwards edge (from the belt conveyor positioned above the floor surface towards the lower floor surface). In this context, it is noted that facing a downward edge forms no resistance, in contrast to an upward edge (that tends to hold the crop material back from moving towards the auger).

Preferably, the fourth shaft is positioned in front of the floor surface. Because the fourth shaft is positioned in front of the floor surface, it is adapted to direct the belt of the belt conveyor towards a further shaft below the floor surface. Thereby, the first and fourth shaft can be positioned in an area between the third and second shaft, in all positions of the slide. Thus both in retracted and extended position of the slide, the first and fourth shaft are located in an area between the second and third shaft. Such configuration functions as a belt length adapting mechanism. Namely, sliding of the slide will oppositely influence the distance between on the one hand the third and fourth shaft and on the other hand the first and second shaft. In this manner, the conveyor belt length (being defined as the length of the belt segment that is located between the first and second shaft), can be adapted via simple and reliable technical system.

Preferably, the third shaft is positioned underneath the floor surface. Because the third shaft is positioned underneath the floor surface, the parts of the belt that do not actively function to transport crop material are located in an area of the header where crop material is not present (crop material is not processed nor transported underneath the floor surface). In this manner, the belt length adapting mechanism does not interfere with the process of transporting and processing the crop material. Furthermore, since the third shaft is located underneath the floor surface, and the third shaft is mounted to the slide, the slide extends underneath the floor surface, which facilitates controlling the cutting height. Since the slide forms the lowest part of the header (since at least a part of the slide extends underneath the floor surface of the header), height sensors can be mounted to the slide to control the height of the cutter bar. This allows the sensors to be placed close to the cutter bar without these sensors being covered by the floor surface in the retracted position of the cutter bar.

Preferably, one of the shafts is powered to drive the belt conveyor. By driving one of the shafts, the belt is forced in a movement over the multiple shafts and in this manner, crop material can be transported from the cutter bar to the auger.

Preferably, at least one of the third and fourth shaft is spring mounted to apply a tension to the belt. The third and fourth shaft are not positioned at a predetermined distance from another element in the header, and are therefore suitable for being spring mounted in a technically easy manner.

Preferably, a fifth shaft is provided and mounted to one of the slide or the frame in such a manner that when the slide is in the retracted position, the fifth shaft is positioned in front of and lower than the fourth shaft. In this manner, the fifth shaft further optimizes movement of the belt.

Preferably, the header is provided with distance sensors mounted in a proximity of the cutter bar to measure the distance between the header and the ground surface. Thereby, preferably, the distance sensors are mounted to the slide. By mounting the distance sensor close to the cutter bar, the cutting height can be controlled in an accurate and easy manner. This is technically possible since the slide forms the lowest part of the header and extends at least partially underneath the floor surface.

Preferably, the belt conveyor comprises multiple segments adjacently positioned along the width of the header, so that the multiple segments extend over substantially the complete width of the header. In practice, a header can have a width of twelve meters and more. By providing the belt conveyor in multiple segments, the twelve meter and more can be covered by multiple segments that are positioned adjacently. Such configuration simplifies replacement of the conveyor belt, and simplifies repairing the conveyor belt.

Preferably, the powered shafts of multiple segments are coupled so that multiple segments can be driven by a single motor. This single motor can be positioned at a lateral side of the header, which allows to easy access the motor for mounting or demounting and maintenance.

Preferably, a base plate is connected via the slide to the cutter bar, which base plate extends underneath the floor surface. More preferably, the base plate extends underneath the complete conveyor so that the conveyor is protected by the base plate. Thereby, the base plate protects the components of the belt conveyor and particularly the belt length adapting mechanism. Furthermore, the base plate allows to lay the header onto a ground surface without breaking it. Furthermore, the base plate can form the basis for mounting height sensors.

Preferably, the header further comprises a reel. Reels are known to assist the crop material that is cut to fall towards the header, so that the transportation of the crop material is further improved.

Preferably, an actuator is provided to operate the slide by moving the slide with respect to the frame, thereby moving the cutter bar from the retracted to the extended position and also changing the length of the belt from short track to long track and vice versa. Via the actuator, an operator of the agricultural harvester that carries the header can adapt the position of the slide to optimize the cutter bar position in function of the height of the crop material.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF THE INVENTION

Figure 1:
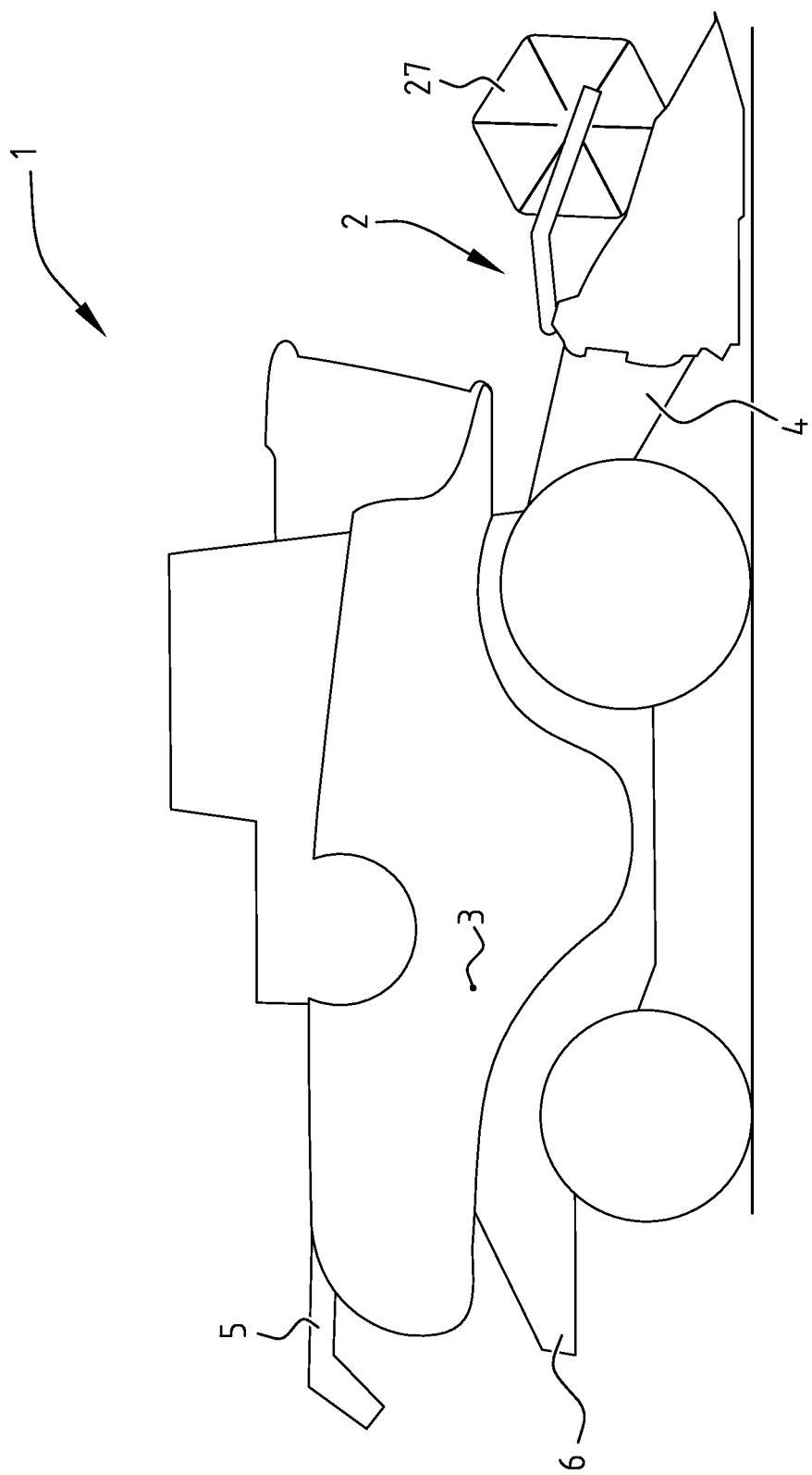
FIG. 1 shows a side view of an agricultural harvester that is suitable for carrying a header according to the invention.

FIG. 1 shows an agricultural harvester 1. At the front end of the agricultural harvester 1, a header 2 is provided. The header 2 is adapted to cut crop material, and to draw the cutted crop material into the agricultural harvester 1. The agricultural harvester has a body 3, that is typically provided to process the crop material, for example to separate the crop elements from the residue elements. Crop material can be drawn into the agricultural harvester 1 via a central crop receiving opening 4. This crop receiving opening 4 is shaped as a duct that extends between a header connecting mechanism of the combine 1 (to which the header 2 is connected in operation) and a body 3 of the agricultural harvester 1.

The agricultural harvester 1 comprises an unloading spout 5 for unloading crop in an external wagon. The agricultural harvester 1 further comprises a residue spreading system 6 provided at the back end of the agricultural harvester so that residue (that originates from the processing of the crop material in the body 3 of the agricultural harvester 1) can be expelled. In this manner, the agricultural harvester 1 can be driven over a field with crop material to be harvested, wherein the header 2 cuts the crop material and draws the crop material into the body 3 of the agricultural harvester 1 via the central crop receiving opening 4. In the body 3 of the agricultural harvester 1, the crop material is processed (also called threshed), so that residue can be expelled via the residue spreading system 6 and the crop can be transported out of the agricultural harvester 1 via the unloading spout 5.

Figure 2:
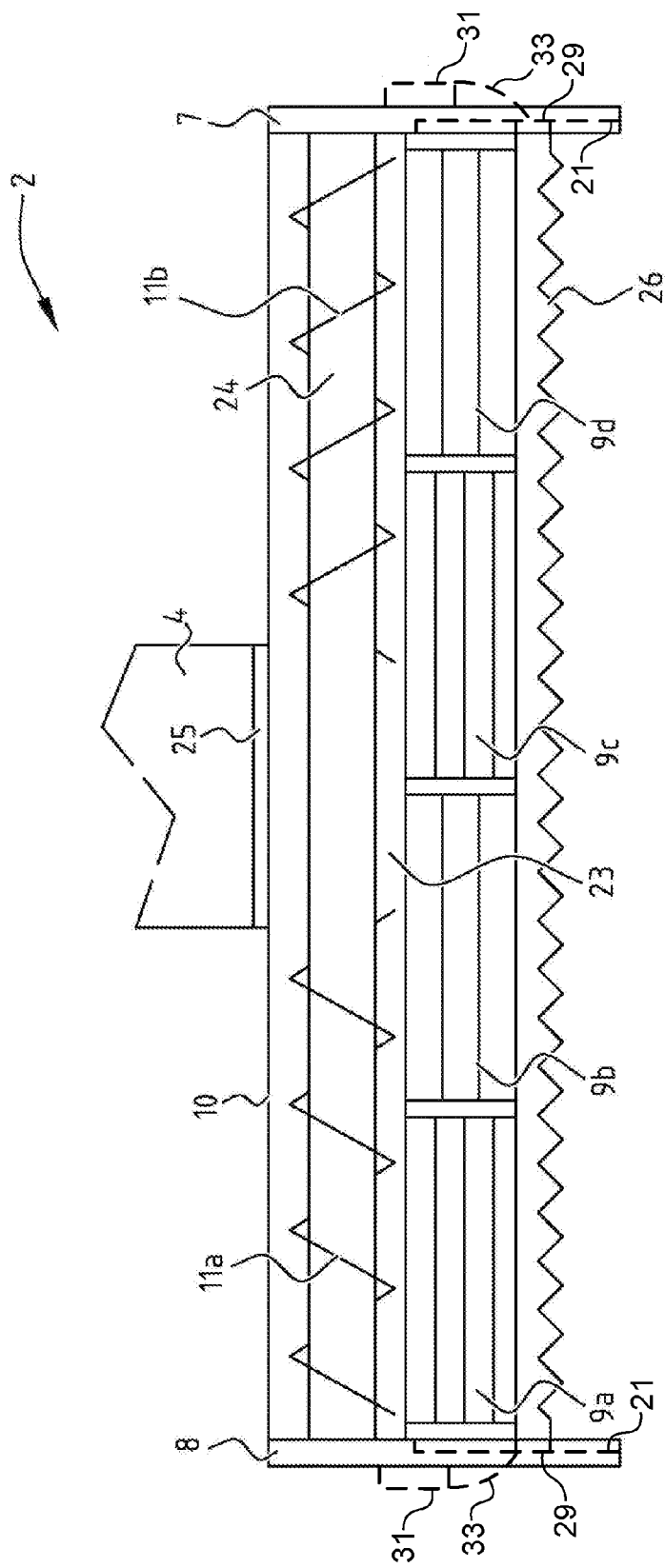
FIG. 2 shows a top view of a header according to an embodiment of the invention.

The present invention particularly relates to auger type headers, a top view of which is shown in FIG. 2. Furthermore, the present invention particularly aims to improve the feeding efficiency of such auger type header 2. An auger type header comprises a floor surface 23. This floor surface 23 extends over substantially the complete width of the header 2. At the lateral end of the header 2, side elements 7, 8 are typically provided. These side elements 7, 8 can comprise driving means for moving elements in the header 2, as will be further explained hereunder. An auger 24 is mounted directly above the floor surface 23. An auger is defined as a screw conveyor that uses a rotating helical screw blade to move the crop material. Thereby, the helical screw blade 11 is mounted in a close proximity of the floor surface 23 so that the crop material can be caught in the volume between adjacent blade sections and can, by rotation of the auger, be transported towards a central opening 25 of the header 2. The central opening 25 of the header 2 is aligned with the crop receiving opening 4 of the agricultural harvester. The auger 24 has a left section and a right section, and the helical screw blade is in each section mounted so that rotation of the auger (in one predetermined rotating direction) moves crop material towards a central part of the header 2. This technique is known in auger type headers and is therefore not explained in further detail in the present description.

The header 2 further comprises a cutter bar 26. The cutter bar is located, in operation of the header 2, close to a ground surface and is provided to sever the plant stalks close to the ground. Regarding feeding efficiency of the header 2, it is known that the distance between the cutter bar 26 and the auger 24 is related to the height of the crop material to be harvested. For this reason, the cutter bar 26 is mounted on a slide shown schematically as 29 on the ends of cutter bar 26 (whereby the guiding elements 21 for the slide 29 can be for example mounted in the side elements 7 and 8 and interact with the guiding elements 21), so that the cutter bar 26 can slide between a retracted position and an extended position. In the retracted position of the cutter bar 26, the distance between the cutter bar 26 and the auger 24 is minimal, and the feeding efficiency is optimized for small plants. In the extended position, the distance between the cutter bar 26 and the auger 24 is maximal so that the feeding efficiency is optimized for large or tall plants.

The side elements 7, 8 can be provided with an actuator 31 or multiple actuators, for example an electrical or hydraulic actuator, for operating the slide by providing a mechanical connection 33 to the ends of cutter bar 26, all shown schematically. Such actuator makes it possible to dynamically adjust the cutter bar 26 position, and in this manner to dynamically optimize the feeding efficiency of the header 2. The auger 24 transports crop material towards a center part of the header 2, where a crop receiving opening 25 is connected to the crop receiving opening 4 of the agricultural harvester 1. In this manner, crop material can be drawn into the agricultural harvester 1.

Due to the distance between cutter bar 26 and auger 24, crop material must travel before being caught by the auger 24. The reel 27 (shown in FIG. 1) assists the crop material in the movement from the cutter bar to the auger by pushing the crop material to fall against the auger 24. The present invention aims to further improve this movement of the crop material from the cutter bar 26 to the auger 24 by providing a belt conveyor 9.

Figure 3:
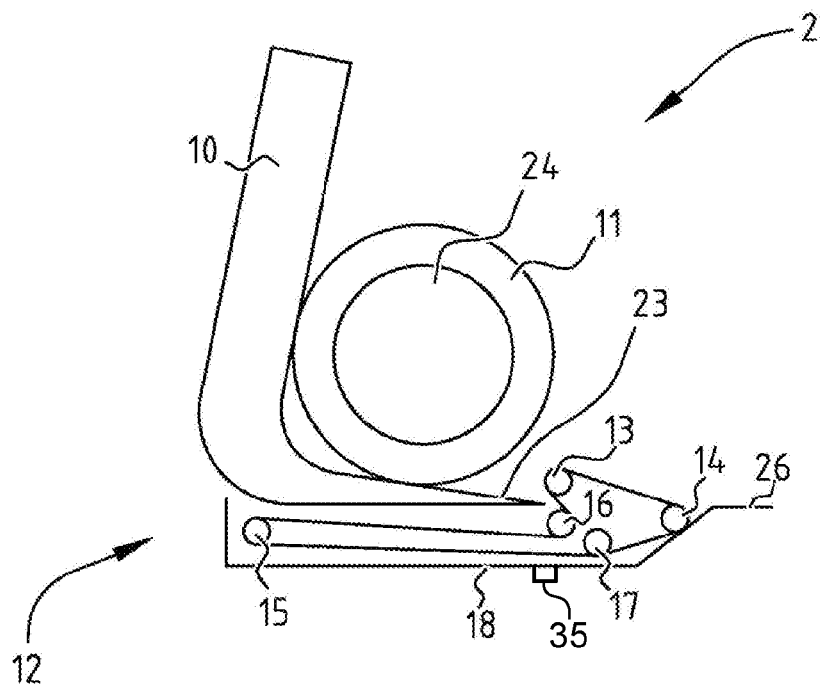
FIG. 3 illustrates a cross-section of a header according to an embodiment of the invention, wherein the slide is in the retracted position.
Figure 4:
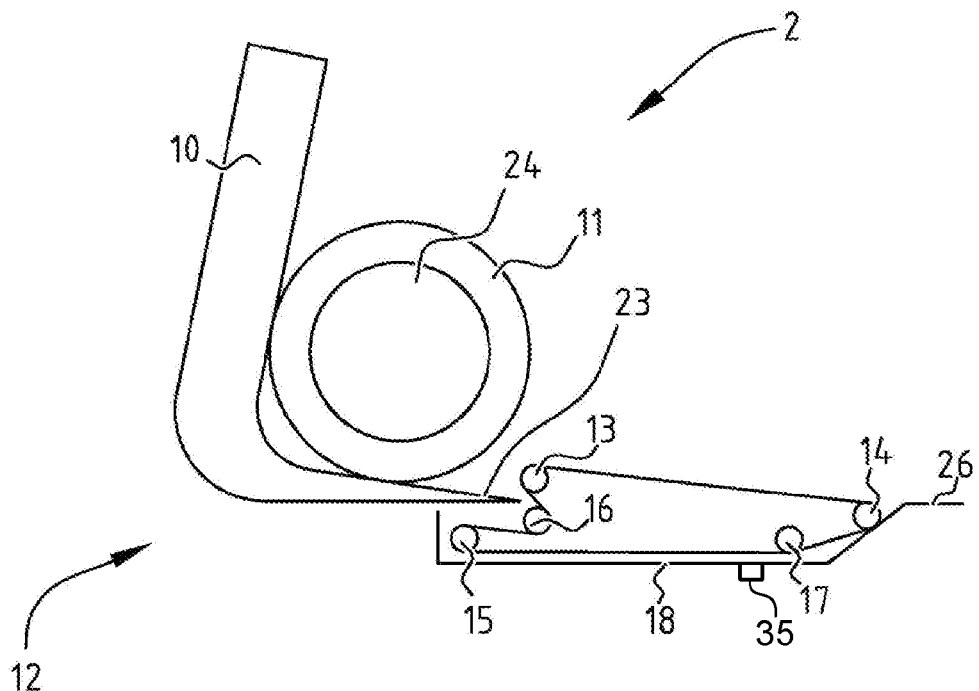
FIG. 4 illustrates the cross-section of the header of FIG. 2 with the slide in the extended position.

The belt conveyor 9 extends between the cutter bar 26 and the auger 24, and is provided to convey the crop material from the cutter bar 26 towards the auger 24. Thereby, the belt of the belt conveyor moves in a direction that is opposite to the straight forward driving direction of the agricultural harvester carrying the header 2 of the invention. The belt conveyor 9 is mounted via a first shaft 13 and a second shaft 14. This is shown in FIGS. 3 and 4. The first shaft 13 is mounted to the frame of the header 2. This means that the first shaft 13 is static, and does not move along with the slide. The first shaft 13 is mounted at a predetermined distance of the auger 24, which predetermined distance is preferably chosen small so that the first shaft 13 is located close to the auger 24. The belt conveyor is thereby provided to deliver the crop material close to the auger 24. The second shaft 14 is mounted to the slide. Thereby, the second shaft 14 is movable along with the cutter bar 26 between a retracted and an extended position by the actuators 31. The second shaft 14 is mounted at a predetermined distance from the cutter bar 26, which predetermined distance is preferably chosen small, so that the second shaft 14 is located in a close proximity of the cutter bar 26. This allows the belt conveyor, being driven over the second shaft, to pick up crop material directly behind the cutter bar 26, and to transport this crop material to the auger 24.

Since the first shaft 13 is static, and the second shaft 14 is movable along with the slide, the length of the belt conveyor (which is only a section of the total length of the belt) can change. To this end, a belt length adapting mechanism is provided. The belt length adapting mechanism allows the distance between the first shaft 13 and the second shaft 14 to change while driving a belt over the first and second shaft. Thereby, the skilled person will recognize that any length adapting mechanism can be used. Hereunder an example of a length adapting mechanism is described.

For the purpose of clarity of the present description, belt is defined as the canvas-shaped element that is driven over a combination of shafts. Conveyor belt is defined as the segment of the belt that is responsible for transporting the crop material in the header 2. In the invention, the conveyor belt is the segment of the belt that extends between the first shaft 13 and the second shaft 14. Conveyor belt length is defined as the distance between the first shaft 13 and the second shaft 14. Belt length is defined as the total length of the canvas-shaped element. Belt length adapting mechanism is defined as a mechanism that is provided to adapt the length of the belt conveyor. Although the skilled person will understand that the shafts that are used to mount the belt are preferably rotatable shafts, this is not necessary. One could mount a belt via shafts wherein at least one of the shafts is fixed (non-rotating), the fixed shaft thereby forms a rod for guiding the belt.

The belt length adapting mechanism comprises, additionally to the first and second shaft, a third shaft 15, a fourth shaft 16 and optionally also a fifth shaft 17. Thereby, the third shaft 15 is mounted to the slide. As a result, the third shaft 15 moves along with the cutter bar 26 and the second shaft 14. The third shaft 15 is located underneath the floor surface 23 of the header 2. The fourth shaft 16 is mounted to the frame of the header 2. Thereby the fourth shaft 16 is a static shaft, similar to the first shaft 13. The fourth shaft 16 is mounted in front of and lower than the first shaft 13. Preferably, the fourth shaft 16 is mounted directly in front of the leading edge of the floor surface 23. In this manner, the belt can be guided from the first shaft 13 that is located above floor surface to the third shaft 15 that is located underneath the floor surface 23 via the fourth shaft 16, that is located substantially in front of the leading edge of the floor surface 23. Optionally, a fifth shaft 17 can be provided to the slide (as is shown in FIGS. 3 and 4) or to the frame of the header (not shown) to optimally guide the belt.

Operation of the slide and its influence on the position of the shafts and the belt is illustrated in FIGS. 3 and 4. FIG. 3 illustrates a header wherein the slide is in the retracted position while FIG. 4 illustrates the same header with the slide in extended position. Thereby, it is shown that the second shaft 14 and the third shaft 15 move along with the slide while the first shaft 13 and the fourth shaft 16 remain at the same location. Since the first shaft 13 and the fourth shaft 16 are located close to one another, and since these first and fourth shafts 13, 16 are located between the second shaft 14 and third shaft 15, the belt conveyor can change length while the belt length remains the same. This is the result of the change in belt conveyor length being compensated by the change in distance between the third shaft and the fourth shaft. When the second shaft 14 is moved in a direction further away from the first shaft 13, the third shaft 15 is moved towards the fourth shaft 16. As a result, the belt length remains the same while the distance between the first shaft and the second shaft changes. In this manner, a technical reliable conveyor belt length adapting mechanism is provided.

A further advantage of the proposed conveyor belt length adapting mechanism is that part of the mechanism extends underneath the floor surface 23. As a result, the slide (that carries at least a part of the belt length adapting mechanism) forms the lowest part of the header 2. A base plate 18 can be provided to cover the slide and the conveyor elements at the lower side of the header. This base plate may also serve as a support for the distance sensors 35 that measure the distance between the header 2 and the ground surface. This allows the distance sensors to be mounted close to the cutter bar, so that the cutting height can be determined in an accurate manner. In this context it is noted that sliding the cutter bar to its retracted position, does not have as a result that the distance sensors 35 are covered by the floor surface 23 as they would in a conventional auger type header. Because the slide extends underneath the floor surface 23, the distance sensors can be mounted to the slide. Thereby, the invention provides a header wherein the feeding efficiency is optimized.

One of the shafts, preferably the third shaft 15, fourth shaft 16 or fifth shaft 17, is spring-mounted in such a manner that the spring-mounted shaft applies a tension to the belt of the belt conveyor 9. It is known in the art of belt conveyors to spring-mount a shaft so that the belt has a tension that is situated in a predetermined tension range.

The belt conveyor 9 is preferably segmented. This is illustrated in FIG. 2, where 4 segments 9a, 9b, 9c and 9d are shown. The width of the header is covered by the multiple segments. Providing the belt conveyor 9 in segments simplifies production of the belt and mounting of the belt. Furthermore, applying a predetermined tension to multiple belts with limited widths (compared to a single belt covering the complete width of the header) is significantly more easy.

The above described embodiments and the shown figures are illustrative and serve only for a better understanding of the invention. The invention is not limited to the described embodiments. Different alternatives, and preferred features described in the text can be freely combined by a skilled person and developed in more detail to form an operational whole without departing from the claimed invention. The scope of protection of the invention will therefore be defined solely by the claims.

The invention claimed is:

1. An agricultural header comprising
a frame adapted to be connected to an agricultural harvester, the frame comprising a floor surface substantially defining the width of the header, wherein an auger is mounted to the frame above the floor surface, the auger being provided to laterally transport crop material towards a central crop-receiving aperture;
a cutter bar forming the leading edge of the header, the cutter bar being mounted to the frame via a slide so that the cutter bar is moveable between a retracted and an extended position; and
a belt conveyor for transporting crop material from the cutter bar towards the auger, the belt conveyor extending between a first shaft that is mounted to the frame at a predetermined distance from the auger and a second shaft that is mounted to the slide at a predetermined distance from the cutter bar, and wherein the belt conveyor is provided with a belt-length-adapting mechanism so that the length of the belt between the first shaft and the second shaft is changeable between a short track corresponding to the retracted position and a long track corresponding to the extended position of the cutter bar, wherein the belt conveyor comprises at least a third shaft and a fourth shaft respectively connected to the slide and the frame, wherein the third and fourth shafts, together with the first and second shafts, form the length-adapting mechanism.

2. The header according to claim 1, wherein the first shaft is positioned at least partly above the floor surface.

3. The header according to claim 1, wherein the fourth shaft is positioned in front of the floor surface.

4. The header according to claim 3, wherein the third shaft is positioned underneath the floor surface.

5. The header according to claim 1, wherein one of the shafts is powered to drive the belt conveyor.

6. The header according to claim 1, wherein at least one of the third and fourth shafts is spring-mounted to apply a tension to the belt.

7. The header according to claim 1, further comprising a fifth shaft mounted to one of the slide or the frame such that when the slide is in the retracted position, the fifth shaft is positioned in front of and lower than the fourth shaft.

8. The header according to claim 1, further comprising distance sensors mounted in a proximity of the cutter bar to measure the distance between the header and the ground surface.

9. The header according to claim 1, wherein the belt conveyor comprises multiple segments adjacently positioned along the width of the header so that the multiple segments extend over substantially the complete width of the header, wherein each segment of the belt conveyor is driven to transport crop material from the cutter bar towards the auger.

10. The header according to claim 5, wherein powered shafts of multiple segments are coupled so that the multiple segments can be driven via a single motor.

11. The header according to claim 1, further comprising a base plate connected to the slide and to the cutter bar, wherein the base plate extends underneath the floor surface.

12. The header according to claim 11, wherein the base plate extends underneath the conveyor so that the conveyor is protected by the base plate.

13. The header according to claim 1, further comprising a reel.

14. The header according to claim 1, further comprising an actuator to operate the slide by moving the slide with respect to the frame thereby moving the cutter bar from the retracted position to the extended position and also changing the length of the conveyor belt from short track to long track and vice versa.

* * * * *